United States Patent [19]

Vavra

[11] 4,271,711

[45] Jun. 9, 1981

[54] 180 DEGREE FOLDING DEVICE

[75] Inventor: Gary J. Vavra, Norwich, Kans.

[73] Assignee: Green Line, Inc., Harper, Kans.

[21] Appl. No.: 15,914

[22] Filed: Feb. 28, 1979

[51] Int. Cl.³ .......................................... F16H 21/44
[52] U.S. Cl. ..................................... 74/96; 74/99 R; 74/101; 172/311
[58] Field of Search ...................... 16/163, 179; 74/96, 74/99 R, 101–107, 519, 520, 522, 522.5; 172/311, 456, 501

[56] References Cited

U.S. PATENT DOCUMENTS

| | | | |
|---|---|---|---|
| 818,783 | 4/1906 | Philippi | 74/104 X |
| 2,173,644 | 9/1939 | Blackmore | 16/163 |
| 2,272,230 | 2/1942 | Van Voorhees | 16/163 X |
| 2,363,667 | 11/1944 | Griswold | 172/456 X |
| 2,385,881 | 10/1945 | Peterson | 74/96 X |
| 2,567,436 | 9/1951 | Lampe | 74/106 |
| 3,055,225 | 9/1962 | Miller | 74/96 |
| 3,692,121 | 9/1972 | Kenney | 172/456 |
| 3,731,747 | 5/1973 | Frank | 172/311 |
| 3,783,951 | 1/1974 | Gugin | 172/478 |
| 3,797,580 | 3/1974 | Roth | 172/311 |
| 3,814,191 | 6/1974 | Tilbury | 172/311 |
| 3,828,860 | 8/1974 | Poland | 172/311 |
| 3,944,001 | 3/1976 | Warner et al. | 172/311 |
| 3,948,327 | 4/1976 | Parker et al. | 172/311 |
| 4,030,551 | 6/1977 | Boetto et al. | 172/311 X |
| 4,034,623 | 7/1977 | Boone et al. | 74/522 |
| 4,046,203 | 9/1977 | Ward | 172/456 |
| 4,047,575 | 9/1977 | Wagner | 172/311 |
| 4,048,790 | 9/1977 | Zweegers | 172/311 X |
| 4,050,523 | 9/1977 | Poland | 172/311 |
| 4,074,766 | 2/1978 | Orthman | 172/501 X |
| 4,151,886 | 5/1979 | Boetto et al. | 172/311 |
| 4,158,367 | 6/1979 | Mailliet | 74/96 X |
| 4,178,998 | 12/1979 | Rockwell | 172/311 |

FOREIGN PATENT DOCUMENTS

| | | |
|---|---|---|
| 2353802 | 10/1973 | Fed. Rep. of Germany . |
| 2275980 | 1/1976 | France . |

*Primary Examiner*—Lawrence J. Staab
*Attorney, Agent, or Firm*—Oblon, Fisher, Spivak, McClelland & Maier

[57] ABSTRACT

A folding mechanism is disclosed for a ground working implement including a first and second frame section, the second frame section including a slot formed therein, a single pivot member connecting the first and second frame sections, a single lever rotatably connected to an end portion of the first frame section, a pin member connected to a first end portion of the single lever and disposed within the slot formed within the second frame section, and a member connected to the single lever for rotating the single lever about the first frame section mounted on the first frame section wherein rotation of the single lever about the first frame section pivots the second frame section about the single pivot member connecting the first and second frame sections.

7 Claims, 3 Drawing Figures

180 DEGREE FOLDING DEVICE

BACKGROUND OF THE INVENTION

1. Field of the Invention

The present invention relates generally to ground working implements or farm equipment such as field cultivators, disks, mowers and other folding equipment to be attached to a driving member such as, for example, a tractor, and more particularly to a folding mechanism for enabling one section of such implement to be automatically pivoted on top of another.

2. Description of the Prior Art

Insofar as ground working implements have become relatively large, transportation and storage of the same in relatively narrow spaces have become increasingly difficult. This problem is particularly acute with regard to transportation of such implements along roads and highways in a convenient manner. On the other hand, based upon economies of operation, farming of relatively large acreages has become necessary, thus necessitating the use of such relatively large ground working implements. Accordingly, it has become recognized that a demand exists for a ground working implement which can both be folded so as to provide a small and compact attachment to a vehicle on the highway and which can be conveniently unfolded so as to provide a relatively large ground working implement when used in the fields.

SUMMARY OF THE INVENTION

Accordingly, one object of the present invention is to provide a 180° folding device for ground working implements which is capable of folding one frame section of the implement onto another frame section attached thereto so as to make the resulting implement relatively small and compact.

Another object of the present invention is to provide a folding mechanism for a ground working implement that allows for desirable lateral stability in a 90° position while utilizing a design which is economical in manufacture due to its simplicity, thus avoiding the complexity of prior art folding mechanisms which have heretofore been more complex than that of the present invention and, furthermore has demonstrated a tendency for the joints connecting the sections to become loose fitting.

A further object of the present invention is to provide for a folding mechanism which holds one frame section in a stable condition with regard to an adjacent frame section by providing a close fit between a roller or pin member and a corresponding slot formed in one of the frame sections at a 90° pivot position when the weight of the pivoted section is centered past the connecting point at the end section of the other frame section.

BRIEF DESCRIPTION OF THE DRAWINGS

Various other objects, features, and attendant advantages of the present invention will be more fully appreciated as the same becomes better understood by the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
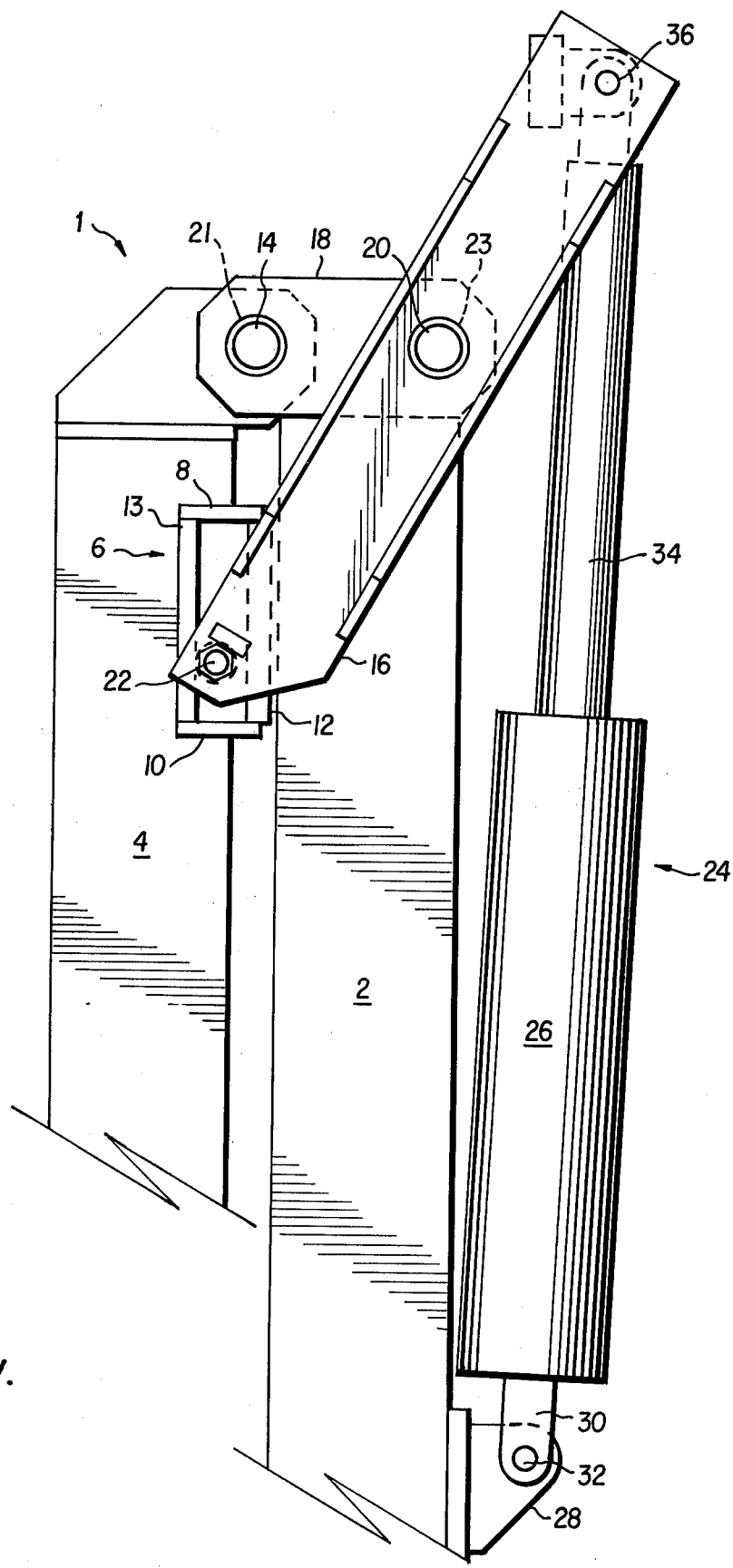
FIG. 1 is an elevational view of a portion of the pivot mechanism of the present invention.
Figure 2:
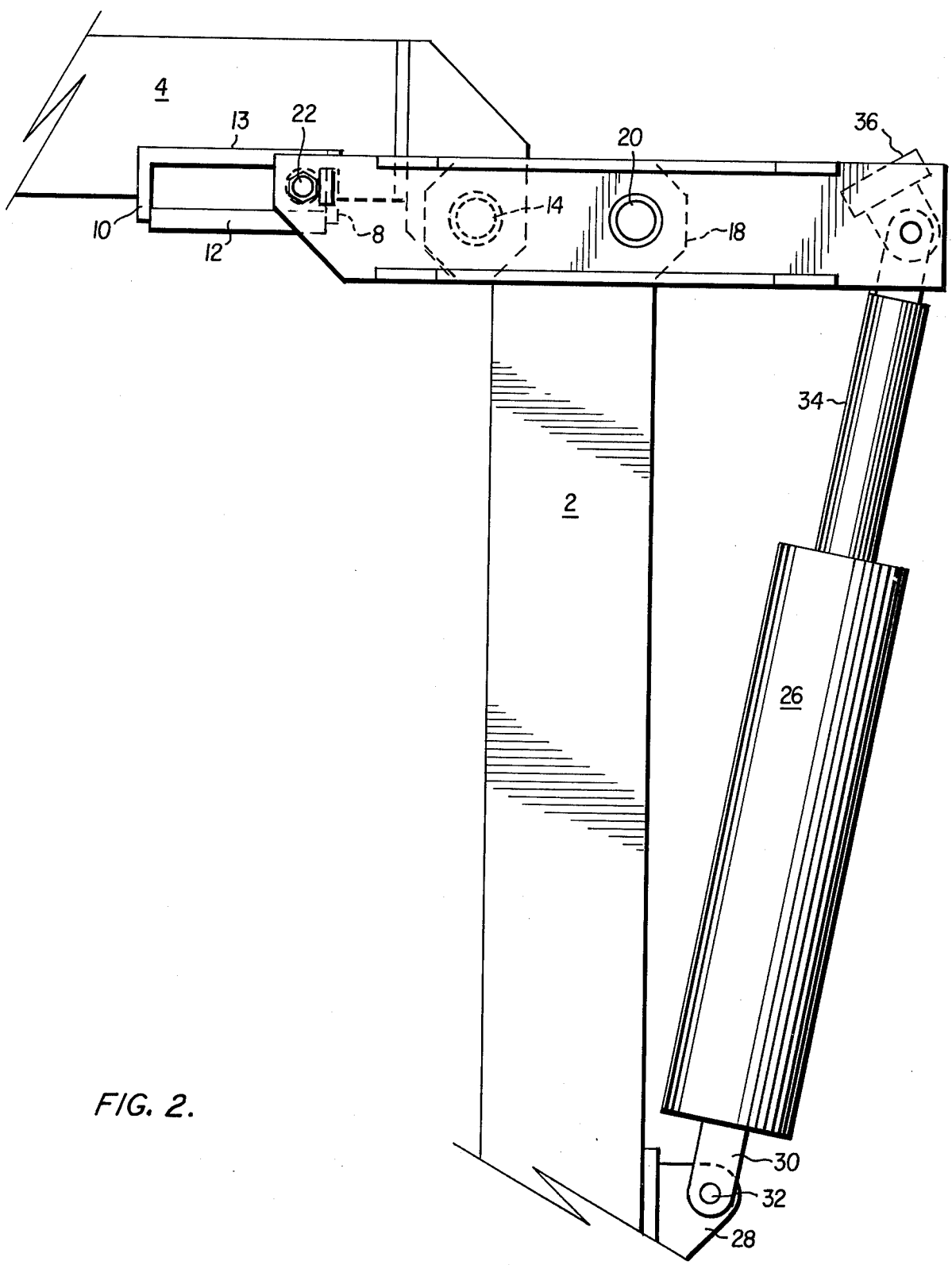
FIG. 2 discloses the pivot mechanism of FIG. 1 shifted so as to provide a 90° relationship between a first and second frame section, and FIG. 3 discloses the pivot mechanism of FIG. 1 wherein a second frame section is pivoted so as to align with a first frame section.

Referring to FIG. 1 of the drawings, there is shown therein a ground working implement 1 such as, for example, a farm implement such as a field cultivator, disk, mower or other equipment transported over the ground and capable of being folded. The ground working implement includes a first frame section 2 and second frame section 4, each of the frame sections being understood to be adapted to carry a cultivator, mower, etc. in a conventional manner.

A single slot member 6 is mounted on or formed within second frame section 4. The single slot member includes in the embodiment shown by way of example of FIG. 1 a first extension member 8, second extension member 10 and slide plate 12 interconnecting extension members 8 and 10. A base member 13 may also be provided opposite slide plate 12 for further connecting extension members 8 and 10 if desired.

First frame section 2 is connected to second frame section 4 by a single pivot member 14 positioned within an opening 21 formed in first and second frame sections 2, 4.

A single lever 16 is also provided and is connected to a flange member 18, which is either connected to the end of first frame section 2 or unitarily formed therewith, and which has formed therein both opening 21 and a second opening 23 with opening 21 being formed adjacent to and above second opening 23.

A pin member 20 is disposed within opening 23 about which single lever 16 is rotatable. Pin member 20 is also located at an intermediate portion of the single lever 16 to allow for at least a 180° pivoting of second frame section 4 about first frame section 2 by single pivot member 14. A second pin member or roller 22 is connected to one end portion of single lever 16 and is disposed within the single slot member 6 formed within or connected to second frame section 4. The second pin member or roller 22 is therefore slidably mounted within single slot member 6 to provide a lost-motion connection between single lever 16 and second frame section 4.

A power member 24 is also provided for rotating single lever 16 about the pin member 20 and may include a hydraulic drive member or other conventional type of drive mechanisms such as, for example, a mechanical worm gear, etc. and which is connected to single lever 16 at one end thereof. A hydraulic cylinder 26 shown by way of example may include hydraulic lines (not shown) for operation of the cylinder with the cylinder being connected to first frame section 4 by a mounting member 28 connecting a flange member 30 extending from one end of the cylinder and a pin member 32. A piston arm 34 extends from cylinder 26 and is connected to single lever 16 by a pivot pin assembly 36.

In operation, the ground working implement 1 can be pivoted from a folded position as shown in FIG. 1 wherein second frame section 4 is pivoted about first frame section 2 so as to be disposed adjacent to and above the first frame section 2. Second frame section 4 can be effectively held in such position by preventing shifting of position 34 in conjunction with cylinder 26 by controlling fluid flow through the hydraulic lines connected to the cylinder 26. It can thus be appreciated that utilization of a single pivot member 14, a single lever 16 rotatably connected to flange member 18 of the first frame section by pin member 20, a slot member 6 formed in second frame section 4 and a second pin member or roller 22 connecting one end portion of the single lever 16 disposed within single slot member 6 is effective in providing a highly responsive control of the pivoting action of second frame section 4 in conjunction with first frame section 2.

To effect pivoting of second frame section 4 so as to form a 90° angle with first frame section 2, it is necessary only to retract piston arm 34 of the hydraulic cylinder 26 so as to rotate single lever 16 about pin member 20 such that second pin member or roller 22 engages second frame section 4 along base member 13 until the second frame section 4 is pivoted to the 90° position. The configuration of single slot member 6 allows for the second pin member or roller 22 to slide along the length of the same while still maintaining control of the position of the second frame section 4.

Figure 3:
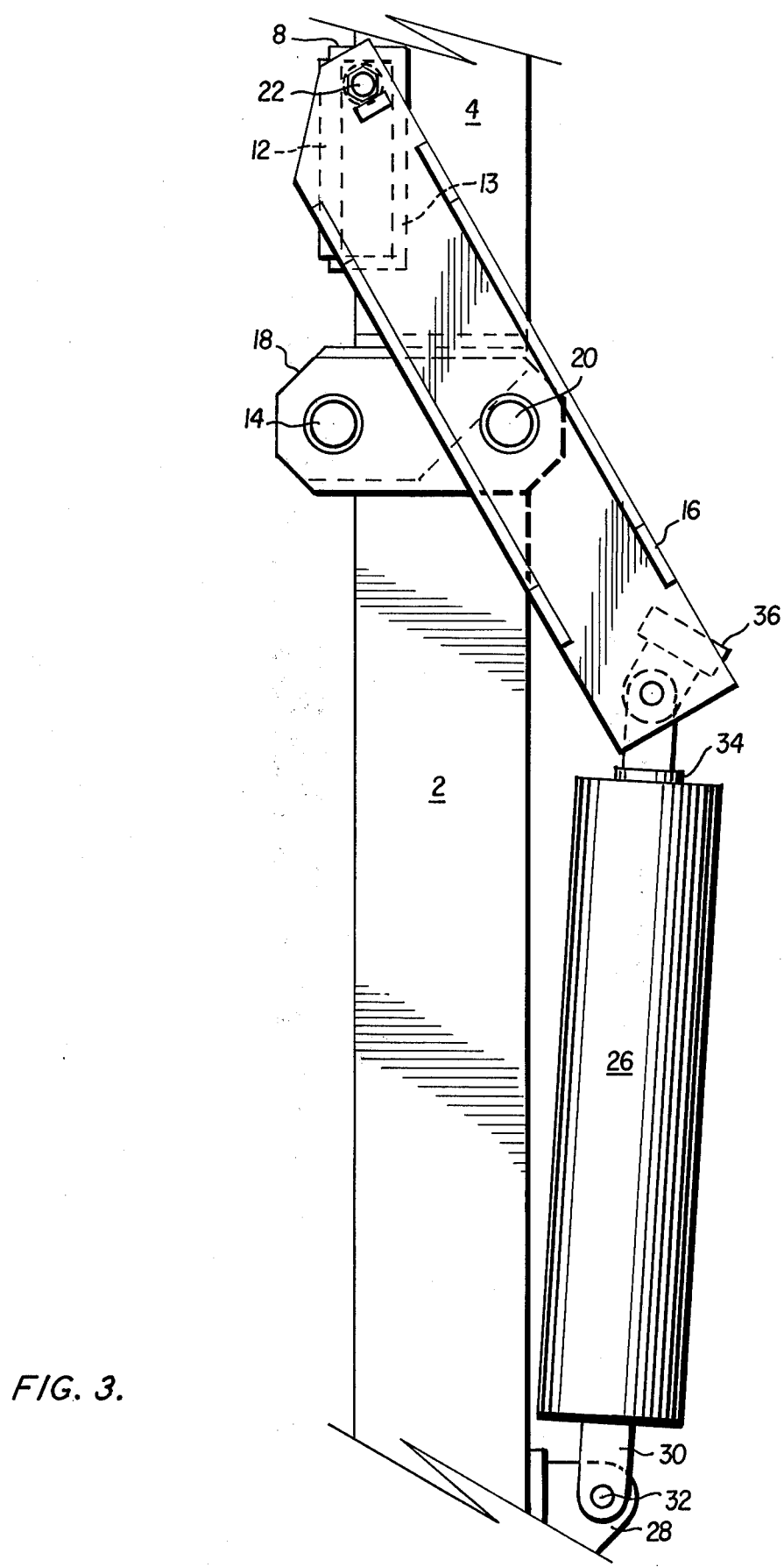

FIG. 3 illustrates a full extension of second frame section 4 with respect to first frame section 2 and also shows the position relating to the operational mode of the ground working implement 1 (i.e. under operating conditions in the field). Under this condition, piston 34 is completely or substantially completely retracted with pin member or roller 22 being shifted in single slot member 6 so as to be disposed adjacent to or in abutting relationship with second extension member 10, thus providing a flexible joint in such extended position.

It can thus be seen that the present invention provides for a folding mechanism for a ground working implement which enables the implement to be both compact for storage or transportation reasons as well as providing an appropriately rigid or flexible joint in an extended position under field operation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A folding mechanism for a ground working implement comprising:
   a fixed first section and pivotable second section, said second section including a slot formed therein;
   a single pivot member connecting said first and second sections;
   a single lever rotatably connected to an end portion of said first section at an intermediate portion of the length of said single lever;
   a pin member connected to a first end portion of said single lever and disposed within said slot formed in said second section; and
   means directly connected to an end portion of said single lever for rotating said single lever about said first section, mounted on said first section, and for rotation of said lever about said first section so as to pivot said second section at least 180° about said single pivot member connecting said first and second section.

2. A folding mechanism for a ground working implement as set forth in claim 1 wherein said end portion of said first section further comprises a flange member, said single pivot member and said single lever being mounted to said flange member.

3. A folding mechanism for a ground working implement comprising:
   a fixed first section and pivotable second section, said second section including a slot formed therein;
   a single pivot member connecting said first and second sections;
   a single lever rotatably connected to an end portion of said first section;
   a pin member connected to a first end portion of said single lever and disposed within said slot formed in said second section; and,
   means directly connected to an end portion of said single lever for rotating said single lever about said first section, mounted on said first section, and for rotation of said single lever about said first section so as to pivot said second section at least 180° about said single pivot member connecting said first and second section wherein said single lever is rotatably connected to said end portion of said first section at an intermediate portion of the length of said single lever and is also rotatably connected between a point of direct connection of said single lever with said means for rotating said single lever and said pin member.

4. A folding mechanism for a ground working implement as set forth in claim 1 wherein said end portion of said first section further comprises a flange member, said single pivot member and said single lever being mounted to said flange member, and wherein said single lever is rotatably connected to said flange member at an intermediate portion of the length of said single lever and between a point of direct connection of said single lever with said means for rotating said single lever and said pin member.

5. A folding mechanism for a ground working implement as set forth in claim 1, wherein said end portion of said first section further comprises a flange member, said single pivot member and said single lever being mounted to said flange member such that said single lever is rotatably connected to said end portion at an intermediate portion of the length of said lever.

6. A folding mechanism for a ground working implement as set forth in claim 1 wherein said pin member comprises a roller member rotatably connected to said first end portion of said single lever.

7. A folding mechanism for a ground working implement as set forth in claim 1, said second section including a first and second extension member projecting therefrom and a slide plate interconnecting said first and second extension member so as to form said slot.

* * * * *